United States Patent
Shin et al.

(10) Patent No.: US 9,685,253 B2
(45) Date of Patent: Jun. 20, 2017

(54) CONDUCTIVE FILM COMPOSITION, CONDUCTIVE FILM FABRICATED USING THE SAME, AND OPTICAL DISPLAY APPARATUS INCLUDING THE SAME

(71) Applicants: Dong Myeong Shin, Uiwang-si (KR); Kyoung Ku Kang, Uiwang-si (KR); Young Kwon Koo, Uiwang-si (KR); Do Young Kim, Uiwang-si (KR)

(72) Inventors: Dong Myeong Shin, Uiwang-si (KR); Kyoung Ku Kang, Uiwang-si (KR); Young Kwon Koo, Uiwang-si (KR); Do Young Kim, Uiwang-si (KR)

(73) Assignee: CHEIL INDUSTRIES, INC., Gumi-Si, Kyeongsangbuk-Do (KR)

( * ) Notice: Subject to any disclaimer, the term of this patent is extended or adjusted under 35 U.S.C. 154(b) by 344 days.

(21) Appl. No.: 14/310,035

(22) Filed: Jun. 20, 2014

(65) Prior Publication Data
US 2014/0302326 A1    Oct. 9, 2014

Related U.S. Application Data

(63) Continuation of application No. PCT/KR2012/005040, filed on Jun. 26, 2012.

(30) Foreign Application Priority Data

Dec. 21, 2011  (KR) .......................... 10-2011-0139596

(51) Int. Cl.
| | | |
|---|---|---|
| *H01B 1/22* | (2006.01) | |
| *H01B 1/16* | (2006.01) | |
| *G06F 3/041* | (2006.01) | |
| *G02B 1/10* | (2015.01) | |

(52) U.S. Cl.
CPC ................. *H01B 1/22* (2013.01); *G02B 1/10* (2013.01); *G06F 3/041* (2013.01); *H01B 1/16* (2013.01); *G06F 2203/04103* (2013.01); *Y10T 428/31507* (2015.04); *Y10T 428/31663* (2015.04); *Y10T 428/31678* (2015.04); *Y10T 428/31681* (2015.04); *Y10T 428/31692* (2015.04)

(58) Field of Classification Search
None
See application file for complete search history.

(56) References Cited

U.S. PATENT DOCUMENTS

| | | | | |
|---|---|---|---|---|
| 2009/0130433 | A1* | 5/2009 | Takada | ................. B22F 1/0025 |
| | | | | 428/328 |
| 2010/0307792 | A1* | 12/2010 | Allemand | ............. B82Y 10/00 |
| | | | | 174/126.1 |

FOREIGN PATENT DOCUMENTS

| | | |
|---|---|---|
| CN | 102250506 A | 11/2011 |
| JP | 2009-129732 A | 6/2009 |
| JP | 2011-29099 A | 2/2011 |
| JP | 2011-70821 A | 4/2011 |
| WO | WO 2007/022226 A2 | 2/2007 |

OTHER PUBLICATIONS

International Search Report for PCT/KR2012/005040.
Taiwanese Office Action for 101148053 dated Apr. 20, 2015; Shin, et al.
Office Action dated Oct. 27, 2015 in corresponding Chinese Patent Application No. 201280066811.0.

* cited by examiner

*Primary Examiner* — Sheeba Ahmed
(74) *Attorney, Agent, or Firm* — Lee & Morse, P.C.

(57) ABSTRACT

A conductive film composition for forming a conductive film in a single coating layer on one or both sides of a base film, the composition including a metal nanowire, and polyfunctional monomers.

23 Claims, 1 Drawing Sheet

CONDUCTIVE FILM COMPOSITION, CONDUCTIVE FILM FABRICATED USING THE SAME, AND OPTICAL DISPLAY APPARATUS INCLUDING THE SAME

CROSS-REFERENCE TO RELATED APPLICATIONS

This application is a continuation of pending International Application No. PCT/KR2012/005040, entitled "CONDUCTIVE FILM COMPOSITION, CONDUCTIVE FILM FABRICATED USING THE SAME, AND OPTICAL DISPLAY APPARATUS INCLUDING THE SAME," which was filed on Jun. 26, 2012, the entire contents of which is hereby incorporated by reference.

BACKGROUND

Embodiments relate to a conductive film composition, a conductive film fabricated using the same, and an optical display apparatus including the same.

SUMMARY

Embodiments are directed to a conductive film composition for forming a conductive film in a single coating layer on one or both sides of a base film, the composition including a metal nanowire, and polyfunctional monomers.

The metal nanowire may include a silver nanowire.

The metal nanowire may have an aspect ratio L/d of length L to diameter d ranging from about 10 to about 1,000.

The metal nanowire may be present in an amount of at least about 50 wt %, based on a total amount of the metal nanowire and the polyfunctional monomers.

The polyfunctional monomers may form an optically transparent matrix after being cured.

When the conductive film composition is formed as the conductive film on the base film, the conductive film may have a haze value of about 3% or less and a total luminous transmittance of about 90% or more.

The polyfunctional monomers may include a polyfunctional monomer that has about three or more (meth)acrylate groups.

The polyfunctional monomers may include a mixture of first polyfunctional monomers and second polyfunctional monomers, and the first polyfunctional monomers may have a different number of (meth)acrylate groups relative to the second polyfunctional monomers.

The polyfunctional monomers may include a mixture of first polyfunctional monomers containing 5 or 6 functional groups and second polyfunctional monomers containing 3 or 4 functional groups, and a weight ratio of the first polyfunctional monomers to the second polyfunctional monomers may range from about 1:1 to about 1:3.

The polyfunctional monomers may include about 5 to about 25 wt % of the first polyfunctional monomers and about 5 to about 35 wt % of the second polyfunctional monomers, based on a total amount of the metal nanowire and the polyfunctional monomers.

The polyfunctional monomers may be present in an amount of about 10 to about 60 wt %, based on a total amount of the metal nanowire and the polyfunctional monomers.

The polyfunctional monomers may have a weight average molecular weight ranging from about 200 g/mol to about 600 g/mol.

The composition may further include an initiator.

The composition may include about 60 to about 90 wt % of the metal nanowire, and about 10 to about 40 wt % of the polyfunctional monomers, based on a total amount of the metal nanowire and the polyfunctional monomers, and about 0.01 to about 2 parts by weight of the initiator, based on 100 parts by weight of the metal nanowire and the polyfunctional monomers.

The composition may further include a mono-functional monomer.

The mono-functional monomer may be present in an amount of about 1 to about 35 parts by weight, based on 100 parts by weight of the polyfunctional monomers.

Embodiments are also directed to a conductor including a base film, and a conductive film coated in a single layer on at least one side of the base film, the conductive film being formed from the conductive film composition.

The conductive film may have a surface resistance of about 600Ω/□ or less.

The base film may be selected from the group of polyester, polycarbonate, polyolefin, cyclic olefin polymer, polysulfone, polyimide, silicone, polystyrene, polyacryl, and polyvinyl chloride films.

The conductor may further include a functional layer on one or both sides of the base film.

The functional layer may include one or more selected from the group of a hard coating layer, an anti-corrosion layer, an anti-glare coating layer, an adhesion promoter layer, and a coating layer for preventing elution of oligomer from the conductive film.

The conductor may have a haze value of about 3% or less and a total luminous transmittance of about 90% or more.

Embodiments are also directed towards an optical display apparatus including a conductive film formed from the conductive film composition.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
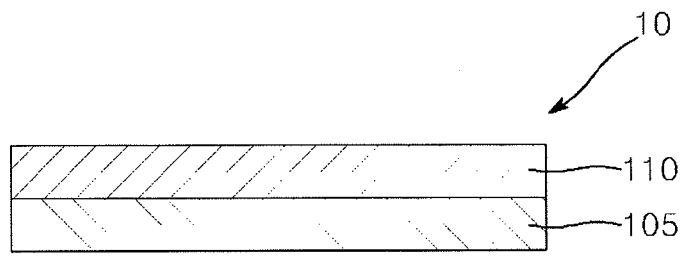
FIG. 1 illustrates a cross-sectional view of a conductor according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Like reference numerals refer to like elements throughout.

In an embodiment, a conductive film composition may include (A) a metal nanowire and (B) a polyfunctional monomer. The conductive film composition may form a conductive film on one or both sides of a base film, thereby forming a conductor.

(A) Metal Nanowire

The metal nanowire may form a conductive network that may be embedded in a matrix of the conductive film after curing. The conductive network of the metal nanowire may impart conductivity to the film together with flexibility.

Further, the metal nanowire may exhibit improved dispersion relative to metal nanoparticles, e.g., due to the nanowire shape. Further, the metal nanowire may significantly reduce surface resistance of the conductive film, e.g., due to a difference in shape between the nanoparticles and the nanowires.

The metal nanowire may have an ultrafine line shape of a certain cross-section. The metal nanowire may have an aspect ratio L/d (that is, the ratio of length (L) to diameter (d) of the nanowire) ranging from about 10 to about 1,000. Within this range, the film composition may realize a highly conductive network at a low density of nanowires and may reduce surface resistance after being cured. The aspect ratio may be greater than about 500 and about 1,000 or less, and may be from about 501 to about 700.

The metal nanowire may have a diameter (d) of about 100 nm or less. Within this range, the metal nanowire may secure a high aspect ratio L/d, thereby realizing a conductive film having high conductivity and low surface resistance. The metal nanowire may have a diameter (d) ranging from about 30 nm to 100 nm, or from about 20 nm to 40 nm.

The metal nanowire may have a length (L) of about 20 μm or more. Within this range, the metal nanowire may secure a high aspect ratio L/d, thereby realizing a conductive film having high conductivity and low surface resistance. The metal nanowire may have a length (L) ranging from about 20 μm to about 50 μm.

The metal nanowire may be composed of a suitable metal. For example, the metal nanowire may be composed of silver, copper, gold, etc., or a mixture thereof. The metal nanowire may be a silver nanowire or a mixture including the same.

The metal nanowire may be present in an amount of about 50 wt % or more, or about 60 wt % or more, based on the total weight ((A)+(B)) of the metal nanowire and the polyfunctional monomer. Within this rage, the metal nanowire may secure sufficient conductivity and may form a conductive network. The metal nanowire may be present in an amount of about 60 to about 90 wt %, or about 60 wt % to about 80 wt %. Within this range, the metal nanowire may provide a coating composition that may be easily dispersed without phase separation when mixed with the polyfunctional monomer.

The metal nanowire may be prepared by a suitable process or from suitable products. For example, the metal nanowire may be prepared by reduction of a metal salt (for example, silver nitrate) under the presence of a polyol and poly(vinylpyrrolidone). Alternatively, the metal nanowire may be obtained from the products of Cambrios Co., Ltd. (for example, CLEAROHM Ink).

(B) Polyfunctional Monomer

The polyfunctional monomer may form a matrix in which the conductive network of the metal nanowire is embedded after being cured. The matrix may form an outer shape of the conductive film, may maintain the shape of the conductive network to secure conductivity, and may substantially prevent the conductive network from being corroded by external impact or moisture when mounted on an optical display apparatus. For this purpose, the matrix may maintain a physically rigid outer shape, and thus may maintain the conductive network of the metal nanowire.

Further, the matrix may be optically transparent in consideration of application of the conductive film. For example, the matrix may have transparency in a visible range, for example, about 400 nm to about 700 nm. Further, the matrix may have good bending properties.

The matrix may have a thickness from about 50 nm to about 500 nm, or from about 90 nm to about 150 nm. Within this range, the matrix may maintain the shape of the conductive network, and thus may be suitably used as the conductive film.

The polyfunctional monomer may be a suitable monomer, e.g., a monomer capable of realizing the aforementioned conditions of the matrix after being cured. For example, a polyfunctional monomer may contain three or more (meth)acrylate groups, or a mixture thereof may be used.

The polyfunctional monomer may improve transparency of the matrix and may reduce surface resistance when mixed with the metal nanowire and cured. By way of comparison, a matrix composed of an oligomer or polymer containing urethane acrylate may exhibit low transparency and a relatively high surface resistance.

The polyfunctional monomer may be a tri- or higher functional monomer. Examples of such polyfunctional monomers may include tri-, tetra-, penta-, hexa- and heptafunctional monomers. These polyfunctional monomers may be used alone or as a mixture thereof. A polyfunctional monomer containing three or more functional groups, a polyfunctional monomer containing three to six functional groups, and the like, or a mixture thereof may be used.

The polyfunctional monomer may have a weight average molecular weight ranging from about 200 g/mol to about 600 g/mol. Within this range, the polyfunctional monomer may provide excellent properties to the matrix in terms of transparency and bending properties while ensuring high coatability and wettability with respect to the base film. The polyfunctional monomer may have a weight average molecular weight ranging from about 296 g/mol to about 579 g/mol.

As for the polyfunctional monomer, polyfunctional monomers having the same number of (meth)acrylate groups or a mixture of multiple types of polyfunctional monomers (where each type of polyfunctional monomer has a different number of (meth)acrylate groups) may be used. In an implementation, the mixture of polyfunctional monomers each having a different number of (meth)acrylate groups may be used.

As for the polyfunctional monomer, a mixture of (B1) a monomer containing 5 to 7 functional groups and (B2) a monomer containing 3 or 4 functional groups may be used. In this mixture, the monomer (B1) and the monomer (B2) may be present in a weight ratio of B1:B2 from about 1:1 to about 1:3.

In an implementation, the polyfunctional monomer may be composed of (B1) a monomer containing 5 or 6 functional groups and (B2) a monomer containing 3 or 4 functional groups. In this mixture, the weight ratio of B1:B2 may range from about 1:1 to about 1:3.

The polyfunctional monomer (B1) may be present in an amount of about 5 to 25 wt %, or from about 5 wt % to about 15 wt %, based on the total weight of the metal nanowire and the polyfunctional monomer ((A)+(B)). Further, the polyfunctional monomer (B2) may be present in an amount of about 5 to 35 wt %, or from about 10 wt % to about 30 wt %, based on the total weight ((A)+(B)) of the metal nanowire and the polyfunctional monomer. Within this range, improved conductivity and optical characteristics of the conductive film may be obtained.

The polyfunctional monomer may be free from a urethane group (i.e., may not be bonded to a urethane group). In an embodiment, there may be no urethane groups in the composition.

The polyfunctional monomer may include a polyfunctional (meth)acrylate compound derived from, e.g., a hydroxyl group in an alcohol, a fluorine modified polyfunctional (meth)acrylate compound, and the like, or a mixture thereof.

In an embodiment, the polyfunctional (meth)acrylate compound derived from the hydroxyl group in alcohol may include, e.g., dipentaerythritol hexa(meth)acrylate, trimethylolpropane tri(meth)acrylate, pentaerythritol tetra(meth)acrylate, ditrimethyloipropane tetra(meth)acrylate, pentaerythritol tri(meth)acrylate, and tris(2-hydroxylethyl) isocyanurate tri(meth)acrylate, and the like. These compounds may be used alone or in combination thereof.

The fluorine modified polyfunctional (meth)acrylate compound may be formed, e.g., by reaction between a perfluoropolyether-containing compound and a polyfunctional (meth)acrylate. Examples of the fluorine modified polyfunctional (meth)acrylate compound may include monomers containing 3 to 16 functional groups, which may be formed by reaction between a perfluoropolyether compound containing various functional groups, such as, e.g., hydroxyl group-containing perfluoropolyether polyol, carboxylic acid group-containing perfluoropolyether dibasic acid, and epoxy group-containing perfluoropolyether epoxy compounds, etc., and a polyfunctional (meth)acrylate compound, such as, e.g., a carboxylic acid-containing modified (meth)acrylate compound, an epoxy group-containing (meth)acrylate compound, an isocyanate group-containing (meth)acrylate compound, and the like. These monomers may be used alone or in combination thereof. The perfluoropolyether compound containing various functional groups may have each of the hydrogens of the polyether group independently substituted with either fluorine or one of the various functional groups described above.

The polyfunctional monomer may be present in an amount of about 10 to about 60 wt % based on the total weight of the metal nanowire and the polyfunctional monomer ((A)+(B)). Within this range, the composition may secure sufficient conductivity after curing, and may form a conductive network. The polyfunctional monomer may be present in an amount of about 10 to about 40 wt %, or about 20 to about 40 wt %.

The conductive film composition may further include an initiator.

(C) Initiator

A suitable initiator may be used, e.g., an initiator capable of absorbing light in a wavelength range from about 150 nm to about 500 nm to cause an optical reaction. The initiator may be used alone or as a mixture of two or more thereof.

For example, the initiator may be a phosphine oxide-based compound. For example, the initiator may be selected from the group of bis-acyl-phosphine oxide (BAPO), 2,4,6-trimethylbenzoylphosphine oxide (TPO), and the like, and a mixture thereof.

The initiator may be present in an amount of about 0.01 to about 2 parts by weight based on 100 parts by weight of the metal nanowire and the polyfunctional monomer ((A)+(B)). Within this range, the initiator may sufficiently cure the polyfunctional monomer, and thus may impregnate the metal nanowire in the polyfunctional monomer without remaining in the film composition. The initiator may be present in an amount of about 0.01 to about 1 part by weight.

The conductive film composition may further include a mono-functional monomer (D). The mono-functional monomer may improve viscosity and wettability when forming the conductive film.

The mono-functional monomer may include a single (meth)acrylate group. Examples of the mono-functional monomer may include a C1 to C5 alkyl group-containing (meth)acrylic acid ester, a hydroxyl group with C1 to C5 alkyl group-containing (meth)acrylic acid ester, a C6 to C10 aryl group-containing (meth)acrylic acid ester, a C5 to C 10 cycloaliphatic group-containing (meth)acrylic acid ester, a C7 to C11 arylalkyl group-containing (meth)acrylic acid ester, and the like, or a mixture thereof For example, the mono-functional monomer may include methyl(meth)acrylate, ethyl(meth)acrylate, propyl(meth)acrylate, cyclohexyl (meth)acrylate, 2-hydroxyethyl(meth)acrylate, phenyl (meth)acrylate, benzyl(meth)acrylate, and the like, and a mixture thereof.

The mono-functional monomer may be present in an amount of about 1 to about 35 parts by weight based on 100 parts by weight of the polyfunctional monomer. Within this range, the mono-functional monomer may improve wettability, coatability, and adhesion with respect to the base film. The mono-functional monomer may be present in an amount of about 15 to about 35 parts by weight, or about 30 to about 35 parts by weight.

In the conductive film composition, the weight ratio of the polyfunctional monomer to the mono-functional monomer may be greater than about 1. For example, the ratio of the polyfunctional monomer to the mono-functional monomer may range from about 2:1 to about 20:1, from about 2:1 to about 5:1, or from about 2:1 to about 4:1.

In an embodiment, the conductive film composition may include about 60 to about 90 wt % of the metal nanowire (A) and about 10 to about 40 wt % of the polyfunctional monomer (B), based on a total amount of the metal nanowire and the polyfunctional monomer ((A)+(B)).

In an embodiment, the conductive film composition may include about 60 to about 90 wt % of the metal nanowire (A), about 10 to about 40 wt % of the polyfunctional monomer (B) (based on a total amount of the metal nanowire and the polyfunctional monomer ((A)+(B))), and about 0.01 to about 2 parts by weight of the initiator (C) based on 100 parts by weight of the metal nanowire and the polyfunctional monomer ((A)+(B)).

In an embodiments, the conductive film composition may include about 50 to about 75 wt % of the metal nanowire (A), about 20 to about 35 wt % of the polyfunctional monomer (B), about 5 to about 15wt % of the mono-functional monomer (D) (based on a total amount of metal nanowire, the polyfunctional monomer, and the mono-functional monomer ((A)+(B)+(D))), and about 0.01 to about 2 parts by weight of the initiator (C) based on 100 parts by weight of the metal nanowire, the polyfunctional monomer, and the mono-functional monomer ((A)+(B)+(D)).

The conductive film composition may further include a solvent to facilitate film formation and to improve coatability with respect to the base film.

The solvent may include a main solvent and a co-solvent, e.g., due to different properties between the metal nanowire and the polyfunctional monomer. Examples of the main solvent may include water, acetone, and the like, and examples of the co-solvent may include alcohols such as methanol, e.g., to allow water to be mixed with acetone.

In an embodiment, a conductor may include a base film, and a conductive film coated on at least one side of the base film and composed of the conductive film composition.

FIG. 1 illustrates a cross-sectional view of a conductor according to an embodiment.

Referring to FIG. 1, the conductor (10) may include a base film (105), and a conductive film (110) formed on an upper side of the base film (105).

The conductor may have a haze value of about 3% or less, as measured using a haze meter, and a total luminous transmittance of about 90% or more. For example, the conductor may have a haze value of about 1 to about 2.6% and a total luminous transmittance ranging from about 90 to about 95%.

The haze and total luminous transmittance may be measured at a suitable wavelength, e.g., about 400 nm to 700 nm.

The base film may be a transparent film.

The base film capable of imparting flexibility or non-flexibility to the conductor may be used.

For example, the base film may be selected from the group of polyester (such as polyethylene terephthalate (PET), and polyester naphthalate), polycarbonate, polyolefin, cyclic olefin polymer, polysulfone, polyimide, silicone, polystyrene, polyacryl, and polyvinyl chloride films, and the like.

The conductor may further include a functional layer formed on one or both sides of the base film. The functional layer may include, e.g., a hard coating layer, an anti-corrosion layer, anti-glare coating layer, an adhesion promoter layer, a coating layer for preventing elution of oligomer from the conductive film, and the like. The oligomer may be derived from one or more of the polyfunctional monomer and the monofunctional monomer.

Figure 2:
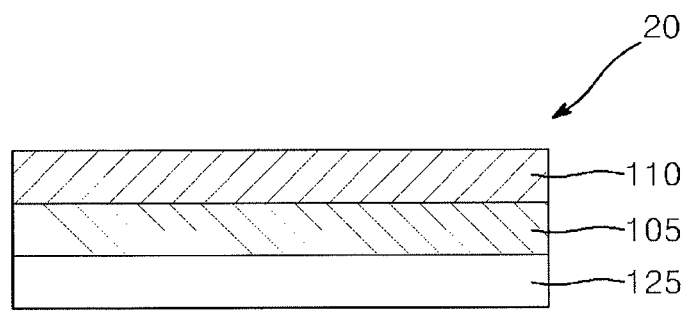
FIG. 2 illustrates a cross-sectional view of a conductor according to an embodiment.

FIG. 2 illustrates a cross-sectional view of a conductor according to an embodiment.

Referring to FIG. 2, the conductor (20) may include a base film (105), a conductive film (110) formed on the upper side of the base film (105), and a functional layer (125) formed on a lower side of the base film (105).

In an embodiment, the conductor may include a base film, a first functional layer formed on the upper side of the base film, a second functional layer formed on the lower side of the base film, and a conductive film formed on an upper side of the first functional layer.

The base film may have a thickness ranging from about 10 μm to about 100 μm. Within this range, the conductor may be used for a touch panel after forming the conductive film.

The conductive film may be composed of a conductive film composition according to an embodiment described above.

The conductive film may be formed on the base film by a suitable method. For example, the conductive film composition may be coated on at least one side of the base film. Then, the film composition may be subjected to drying and baking, followed by UV curing at about 300 to about 700 mJ/cm$^2$ to form the conductive film.

Although the conductive film may be formed as a single coating (conductive) layer on the at least one side of the base film, it may be advantageous that the conductive film is farmed on one side of the base film.

The conductive film may be formed as a single coating layer on the base film. In an embodiment, there may be no overcoat, e.g., no urethane group containing layer, on the conductive film formed from the composition.

The conductive film may have a thickness ranging from about 10 μm to about 200 μm. Within this range, the conductor may be used for a touch panel after forming the conductive film.

The conductive film may have a surface resistance of about 600Ω/□ or less as measured using a 4-probe tester. With this surface resistance, the conductive film may be used as a film for a touch panel and may exhibit both conductivity and transparency. For example, the conductive film may have a surface resistance ranging from about 120Ω/□ to about 400Ω/□.

In an embodiment, an optical display apparatus may include the conductive film and/or the conductor. Examples of the optical display apparatus may include touch screen panels, organic light emitting diode displays, liquid crystal displays, and the like.

Figure 3:
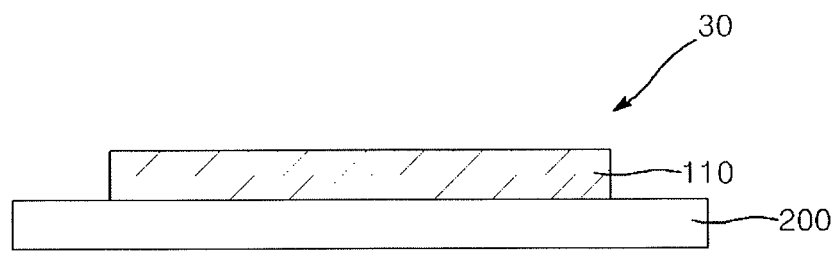
FIG. 3 illustrates a cross-sectional view of an optical display apparatus according to an embodiment.

FIG. 3 illustrates a cross-sectional view of an optical display apparatus according to an embodiment.

Referring to FIG. 3, an optical display apparatus may include a panel or substrate (200), and conductive film (110) may be formed on an upper side of the panel or substrate (200).

The panel or substrate may include a panel for a OLED, a panel for a LCD, a touch screen panel, a glass substrate, and the like.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Detailed specifications of the components use in the following examples and comparative example are as follows.

(A) Metal nanowire: Silver nanowire included in CLEAROHM Ink™ (Ink-A G4-01, Cambrios Co., Ltd., aspect ratio: above 500, comprising silver nanowire)

(B) Polyfunctional monomer: (B1) dipentaerythritol hexaacrylate (DPHA) as a 6-functional monomer and (B2) trimethylolpropane triacrylate (TMPTA) as a 3-functional monomer (C) Initiator: (Cl) bis-acyl-phosphine oxide (BAPO, Darocur 819W, CIBA Co., Ltd.), (C2) 2,4,6-trimethylbenzoyl phosphine oxide (TPO, CIBA Co., Ltd.)

(D) 2-hydroxyethyl methacrylate (HEMA) as a monofunctional monomer (E) Urethane Acrylate Examples 1 to 3

Each conductive film composition was prepared using components of Table 1 (unit: g in terms of solid content). CLEAROHM Ink™ (Ink-A G4-01, Cambrios Co., Ltd.) was placed and stirred in deionized water, to prepare a solution comprising silver nanowire. DPHA, TMPTA or HEMA were dissolved in acetone to prepare a solution comprising a polyfunctional monomer or a monofunctional monomer. The initiator was dissolved in acetone to prepare a solution comprising the initiator. The prepared solution comprising silver nanowire, the solution comprising a polyfunctional monomer or a monofunctional monomer, the solution comprising the initiator, and methanol were mixed to prepare a conductive film composition.

Then, the prepared conductive film composition was coated on a base film (cyclo olefin polymer (COP) film), both sides of which were subjected to hard coating, thickness: 66 μm, Zeon Co., Ltd.) using a wire bar. The resultant was dried in an oven at 80° C. for 1 minute, followed by baking at 120° C. for 1 minute. Then, the baked resultant was subjected to UV curing at 500 mJ/cm$^2$ in a nitrogen atmosphere, thereby preparing a conductor having a 150 nm thick single-layered conductive film on one side of the base film.

Comparative Example 1

A conductive film composition was prepared by the same method as in Example 1 except that urethane acrylate was used instead of DPHA and TMPTA. As in Example 1, a conductor having a 150 nm thick single-layered conductive film on one side of a base film was prepared.

Comparative Example 2

CLEAROHM Ink™ (Ink-A G4-01, Cambrios Co., Ltd.) was placed and stirred in ultrapure distilled water, to prepare a solution comprising silver nanowire. Urethane acrylate was dissolved in acetone to prepare a solution comprising the urethane acrylate. The initiator was dissolved in acetone to prepare a solution comprising the initiator. The prepared solution comprising silver nanowire was coated on a base film (cyclo olefin polymer (COP) film, both sides of which were subjected to hard coating, thickness: 66 μm, Zeon Co., Ltd.) using a wire bar. The resultant was dried in an oven at 80° C. for 1 minute, followed by baking at 120° C. for 1 minute. Then, the prepared solution comprising the urethane acrylate and the prepared solution comprising the initiator was mixed and coated on the baked resultant using a wire bar, followed by drying in an oven at 80° C. for 1 minute and baking at 120° C. for 1 minute. Then, the resultant was subjected to UV curing at 500 mJ/cm$^2$ in a nitrogen atmosphere, thereby preparing a double-layered conductor having a 150 nm thick metal nanowire layer and a cured layer of the urethane acrylate and the initiator on one side of the base film.

Experimental Example

The following properties of the prepared conductors were evaluated.

(1) Haze value and total luminous transmittance: The haze value and the total luminous transmittance of the conductor were measured using a haze meter NDH 2000 (Nippon Denshoku Co., Ltd.) at 400 to 700 nm.

The total luminous transmittance was obtained by the sum of diffusive transmittance light (DF) and parallel transmittance light (PT). Higher total luminous transmittance was evaluated as providing a higher transmittance level. The haze value was obtained by the value of diffusive transmittance light (DF)/parallel transmittance light (PT).

(2) Surface resistance: Surface resistance of the conductive film was measured using a surface resistance tester MCP-T610 (Mitsubish Chemical Analytech Co., Ltd.) after 10 seconds from a time point of bringing the four probes of the surface resistance tester into contact with a surface of the conductive film.

(3) Cross-cut: 100 cells were formed in an area of 10 mm×10 mm on the surface of the conductive film using a cutter knife, followed by attaching and detaching 3M SCOTCH magic tape three times thereon in longitudinal/transverse/diagonal directions. Then, it was determined using an optical microscope whether the coating layer was removed from the conductive film. No separation of the coating layer was evaluated as ○ and separation of the coating layer was evaluated as ×.

TABLE 1

| | | Example 1 | Example 2 | Example 3 | Comparative Example 1 | Comparative Example 2 |
|---|---|---|---|---|---|---|
| (A) | | 80 | 60 | 60 | 80 | 100 |
| (B) | (B1) | 10 | 10 | 30 | — | — |
| | (B2) | 10 | 30 | — | — | — |
| (C) | (C1) | 0.25 | 0.25 | 0.25 | 0.25 | 0.25 |
| | (C2) | 0.25 | 0.25 | 0.25 | 0.25 | 0.25 |
| (D) | | — | — | 10 | — | — |
| (E) | | — | — | — | 20 | 100 |
| Haze (%) | | 1.42 | 1.63 | 2.52 | 4.57 | 1.44 |
| Total luminous transmittance (%) | | 90.48 | 90.28 | 90.98 | 90.04 | 90.97 |
| Surface resistance (Ω/□) | | 120 | 400 | 200 | Immeasurable due to high resistance | 120 |
| Cross-cut | | ○ | ○ | ○ | X | ○ |

As illustrated in Table 1 above, the conductive film composition may allow for a conductive film having high transparency and low surface resistance. Further, a single layered conductive film composed of the conductive film composition may exhibit similar transparency and surface resistance to a double-layered conductive film.

By way of summary and review, conductive films may be used in a variety of applications including, e.g., touch screen panels and flexible display panels for display devices. It may be desirable for the conductive films to have not only good properties in terms of transparency, surface resistance, etc., but also good bending properties, e.g., for use in flexible displays.

A conductive film may be formed by depositing indium tin oxide (ITO) films on both sides of a base film comprised of polyethylene terephthalate (PET). The ITO films may be deposited on the base film by dry deposition, e.g., for improved economic feasibility and transparency. However, the ITO film may provide high resistance and undesirable bending properties to the conductive film. To solve such problems, a conductive film may be formed by coating, e.g., a conductive polymer, carbon nanotubes, and/or metal nanoparticles instead of the ITO films on a base film via a wet film coating process. However, this method may provide a low coefficient of transmittance, which may be undesirable for a transparent conductive film and may result in deteriorating reliability. Further, the metal nanoparticles may increase resistance, e.g., due to poor dispersion in the film.

A silver nanowire solution may be coated on a base film by a wet film coating process to prepare a conductive film. For example, a solution may be prepared by dissolving a silver nanowire in water and this solution may be coated on the base film, so that the silver nanowire may be deposited on the base film. However, in this process, to compensate for low adhesion to the base film and low solvent resistance, the conductive film may be prepared in a double layer structure by depositing an overcoat layer, which may be formed by curing a mixture of urethane acrylate and an initiator, on the silver nanowire layer. This process may overcome the problems in terms of transparency, conductivity, and the like, but may still have problems of high manufacturing cost and deteriorated workability.

The embodiments provide a conductive film composition, a conductive film fabricated using the same, and an optical display apparatus including the same. In an embodiment, a conductive film composition may provide a single-layered conductive film with improved transparency, improved surface resistance, improved bending properties, and the like and may allow for a simple and economical manufacturing process of forming the conductive film. The conductive film composition may allow for a conductive film having high transparency and low surface resistance. Further, a single layered conductive film composed of the conductive film composition may exhibit similar transparency and surface resistance to a double-layered conductive film, without requiring an overcoat layer.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A conductive film composition for forming a conductive film in a single coating layer on one or both sides of a base film, the composition comprising:
   a metal nanowire;
   polyfunctional monomers, the polyfunctional monomers being free from a urethane group; and
   an initiator, the initiator absorbing light in a wavelength range of about 150 nm to about 500 nm to cause an optical reaction,
   wherein the metal nanowire is present in an amount of at least about 50 wt %, based on a total amount of the metal nanowire and the polyfunctional monomers.

2. The conductive film composition as claimed in claim 1, wherein the metal nanowire includes a silver nanowire.

3. The conductive film composition as claimed in claim 1, wherein the metal nanowire has an aspect ratio L/d of length L to diameter d ranging from about 10 to about 1,000.

4. The conductive film composition as claimed in claim 1, wherein the polyfunctional monomers form an optically transparent matrix after being cured.

5. The conductive film composition as claimed in claim 1, wherein, when the conductive film composition is formed as the conductive film on the base film, the conductive film has a haze value of about 3% or less and a total luminous transmittance of about 90% or more.

6. The conductive film composition as claimed in claim 1, wherein the polyfunctional monomers include a polyfunctional monomer that has about three or more (meth)acrylate groups.

7. The conductive film composition as claimed in claim 1, wherein the polyfunctional monomers include a mixture of first polyfunctional monomers and second polyfunctional monomers, and the first polyfunctional monomers have a different number of (meth)acrylate groups relative to the second polyfunctional monomers.

8. The conductive film composition as claimed in claim 1, wherein:
   the polyfunctional monomers include a mixture of first polyfunctional monomers containing 5 or 6 functional groups and second polyfunctional monomers containing 3 or 4 functional groups, and
   a weight ratio of the first polyfunctional monomers to the second polyfunctional monomers ranges from about 1:1 to about 1:3.

9. The conductive film composition as claimed in claim 8, wherein the polyfunctional monomers include about 5 to about 25 wt % of the first polyfunctional monomers and about 5 to about 35 wt % of the second polyfunctional monomers, based on a total amount of the metal nanowire and the polyfunctional monomers.

10. The conductive film composition as claimed in claim 1, wherein the polyfunctional monomers are present in an amount of about 10 to about 60 wt %, based on a total amount of the metal nanowire and the polyfunctional monomers.

11. The conductive film composition as claimed in claim 1, wherein the polyfunctional monomers have a weight average molecular weight ranging from about 200 g/mol to about 600 g/mol.

12. The conductive film composition as claimed in claim 1, wherein the composition includes:
   about 60 to about 90 wt % of the metal nanowire, and
   about 10 to about 40 wt % of the polyfunctional monomers, based on a total amount of the metal nanowire and the polyfunctional monomers, and
   about 0.01 to about 2 parts by weight of the initiator, based on 100 parts by weight of the metal nanowire and the polyfunctional monomers.

13. The conductive film composition as claimed in claim 1, further comprising a mono-functional monomer.

14. The conductive film composition as claimed in claim 13, wherein the mono-functional monomer is present in an amount of about 1 to about 35 parts by weight, based on 100 parts by weight of the polyfunctional monomers.

15. A conductor, comprising:
   a base film; and
   a conductive film coated in a single layer on at least one side of the base film, the conductive film being formed from the conductive film composition as claimed in claim 1.

16. The conductor as claimed in claim 15, wherein the conductive film has a surface resistance of about 600Ω/□ or less.

17. The conductor as claimed in claim 15, wherein the base film is selected from the group of polyester, polycarbonate, polyolefin, cyclic olefin polymer, polysulfone, polyimide, silicone, polystyrene, polyacryl, and polyvinyl chloride films.

18. The conductor as claimed in claim 15, further comprising a functional layer on one or both sides of the base film.

19. The conductor as claimed in claim 18, wherein the functional layer includes one or more selected from the group of a hard coating layer, an anti-corrosion layer, anti-glare coating layer, an adhesion promoter layer, and a coating layer for preventing elution of oligomer from the conductive film.

20. The conductor as claimed in claim 15, wherein the conductor has a haze value of about 3% or less and a total luminous transmittance of about 90% or more.

21. An optical display apparatus comprising a conductive film formed from the conductive film composition as claimed in claim 1.

22. A conductive film composition for forming a conductive film in a single coating layer on one or both sides of a base film, the composition comprising:
  a metal nanowire; and
  polyfunctional monomers,
  wherein the polyfunctional monomers include a mixture of first polyfunctional monomers and second polyfunctional monomers, and the first polyfunctional monomers have a different number of (meth)acrylate groups relative to the second polyfunctional monomers, and
  wherein the metal nanowire is present in an amount of at least about 50 wt %, based on a total amount of the metal nanowire and the polyfunctional monomers.

23. A conductive film composition for forming a conductive film in a single coating layer on one or both sides of a base film, the composition comprising:
  a metal nanowire; and
  polyfunctional monomers,
  wherein:
    the polyfunctional monomers include a mixture of first polyfunctional monomers containing 5 or 6 functional groups and second polyfunctional monomers containing 3 or 4 functional groups, and
    a weight ratio of the first polyfunctional monomers to the second polyfunctional monomers ranges from about 1:1 to about 1:3.

* * * * *